US012719743B2

(12) United States Patent
Zimmerman et al.

(10) Patent No.: US 12,719,743 B2
(45) Date of Patent: Aug. 25, 2026

(54) SYSTEMS AND METHODS FOR PREVENTING ARC ON NETWORK CABLE DISCONNECT

(71) Applicant: Cisco Technology, Inc., San Jose, CA (US)

(72) Inventors: George Allan Zimmerman, Manhattan Beach, CA (US); Chad M. Jones, Doylestown, OH (US); Jason Dewayne Potterf, Austin, TX (US); Joel Richard Goergen, Soulsbyville, CA (US); Elizabeth Kochuparambil, Morgan Hill, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 403 days.

(21) Appl. No.: 18/360,260

(22) Filed: Jul. 27, 2023

(65) Prior Publication Data

US 2025/0039039 A1 Jan. 30, 2025

(51) Int. Cl.

*H04L 41/0659* (2022.01)
*G08B 5/22* (2006.01)
*H04L 12/12* (2006.01)

(52) U.S. Cl.

CPC ............ *H04L 41/0659* (2013.01); *G08B 5/22* (2013.01); *H04L 12/12* (2013.01)

(58) Field of Classification Search

None

See application file for complete search history.

(56) References Cited

U.S. PATENT DOCUMENTS 7,499,977 B1 * 3/2009 Valluru ................ H04Q 3/0075 455/39
8,373,420 B2 * 2/2013 Lupaczyk ............. G01R 31/52 324/509
9,478,382 B1 * 10/2016 Aromin ................ H01H 71/128
9,595,846 B2 * 3/2017 Siglock ................... H02J 9/061
9,640,969 B2 * 5/2017 Li ........................ H02H 1/0015
10,069,538 B2 * 9/2018 Alam ................. H04L 41/0659
10,477,199 B2 * 11/2019 Bowler ................. H04N 17/00
11,205,891 B2 * 12/2021 Meyer ...................... H02H 3/38

(Continued)

FOREIGN PATENT DOCUMENTS

CN 116155703 A * 5/2023 ......... H04L 41/0668
CN 116471173 A * 7/2023 ........... H04L 41/069

(Continued)

*Primary Examiner* — Melvin H Pollack

(74) *Attorney, Agent, or Firm* — Edell, Shapiro & Finnan, LLC

(57) ABSTRACT

Presented herein are techniques for preventing an electrical arc upon disconnect of a network cable. A method can include monitoring a network cable connected to a device for faults at a remote location from a connector of the network cable by observing conditions on the network cable of power applied to the network cable, wherein the network cable is for sending data and power. The method can further include detecting a fault on the network cable, wherein the fault was introduced intentionally at the connector prior to disconnecting the connector from the device. The method can further include terminating power at the remote location that is sent over the network cable to prevent an electrical arc upon disconnecting the connector from the device.

26 Claims, 8 Drawing Sheets

(56) References Cited

U.S. PATENT DOCUMENTS 11,215,646 B2 * 1/2022 Balid .................... G01R 15/26
11,277,000 B2 * 3/2022 Kanemaru ............... H02H 3/00
11,437,211 B2 * 9/2022 Kumar ................. G01R 33/072
11,456,142 B2 * 9/2022 Manahan ............... H01H 9/168
11,456,771 B1 * 9/2022 Bennett .................... H04B 1/40
11,508,539 B2 * 11/2022 Montenegro .......... G01R 27/16
11,509,130 B2 * 11/2022 Mishra .................... G06F 13/20
11,671,926 B2 * 6/2023 Bennett .................... H04B 3/46 455/127.1
11,698,403 B2 * 7/2023 Schroeder ................ H02H 7/26 361/78
11,699,919 B2 * 7/2023 Pachoud .............. H01H 47/002 307/64
11,719,400 B2 * 8/2023 Dansalami .......... F21V 23/0471 362/20
11,721,508 B2 * 8/2023 Telefus .................. H01H 83/04 361/42
11,742,651 B2 * 8/2023 Dickey ................ H02H 1/0015 324/536
11,831,146 B2 * 11/2023 Wahlroos ............... G01R 31/52
11,869,733 B2 * 1/2024 Manness .................. H01H 9/20
12,050,511 B2 * 7/2024 Nof ..................... G06F 11/3447
12,051,313 B2 * 7/2024 Mahmoud .............. H02H 7/226
12,057,692 B2 * 8/2024 Eriksen .................. H02H 7/226
12,107,447 B2 * 10/2024 Khozikov .............. B64D 31/16
12,125,358 B2 * 10/2024 Shyu .................. G08B 21/0453
12,155,164 B2 * 11/2024 King .................... H02B 1/0565
12,266,916 B2 * 4/2025 Kannan .................. H02H 3/087
12,283,809 B2 * 4/2025 Yang ...................... H02H 7/268
12,424,937 B2 * 9/2025 Schmitz .............. H02M 1/0009
12,425,262 B2 * 9/2025 Rao .......................... H02H 3/08
2005/0012575 A1 1/2005 Huang et al.
2008/0123537 A1 * 5/2008 Kumhyr .............. H04L 41/0661 370/249
2012/0089266 A1 4/2012 Tomimbang et al.
2013/0088952 A1 * 4/2013 Balasubramanian ........................ H04L 41/0654 370/217
2016/0291073 A1 10/2016 Handy et al.
2020/0278402 A1 9/2020 Goergen et al.
2021/0167976 A1 6/2021 Goergen et al.
2022/0181866 A1 * 6/2022 Klippel .................... H02H 3/44
2022/0190528 A1 6/2022 Arduini et al.
2022/0206451 A1 * 6/2022 Prem ........................ H02H 3/05
2022/0209821 A1 * 6/2022 Eriksen ................ H02H 1/0092
2022/0245574 A1 * 8/2022 Cella .................... G06Q 10/087
2022/0297558 A1 * 9/2022 Daoura ................. H02J 7/0031
2022/0406581 A1 * 12/2022 Guo .................. H01J 37/32944
2023/0125152 A1 * 4/2023 Eriksen .................. H01H 71/04 361/42
2023/0283062 A1 * 9/2023 Hutchinson ............ H02H 3/046 361/93.1
2023/0298843 A1 * 9/2023 Collett ..................... H02B 1/24 361/42
2023/0400500 A1 * 12/2023 Ball ..................... H02H 1/0092
2023/0421200 A1 * 12/2023 Barnickel ................ H04B 3/52
2024/0073567 A1 * 2/2024 Barnickel .......... H04Q 11/0067
2024/0155801 A1 * 5/2024 Pachoud ................ H01R 24/20
2024/0178647 A1 * 5/2024 Konash ................ H02H 1/0092
2025/0202218 A1 * 6/2025 Erven ...................... H02H 7/26

FOREIGN PATENT DOCUMENTS

EP 1329733 A2 7/2003
JP 2018074703 A * 5/2018
WO WO-2011090464 A1 * 7/2011 ........... H02H 1/0023
WO WO-2012153528 A1 * 11/2012 ......... H04L 41/0686
WO WO-2015176603 A1 * 11/2015 ............. H04L 41/00
WO WO-2025199621 A1 * 10/2025

* cited by examiner

120

SYSTEMS AND METHODS FOR PREVENTING ARC ON NETWORK CABLE DISCONNECT

TECHNICAL FIELD

The present disclosure relates to systems and methods for preventing an electrical arc upon disconnect of a connector of a network cable from a device.

BACKGROUND

Computer and network devices can communicate with each other over a network. Such devices can be connected to one another via network cables. The network cables can be a hard line connection between the devices and can form a network such as a Local Area Network (LAN). The network cables can carry data and electrical power.

DESCRIPTION OF EXAMPLE EMBODIMENTS

Overview

Figure 1A:
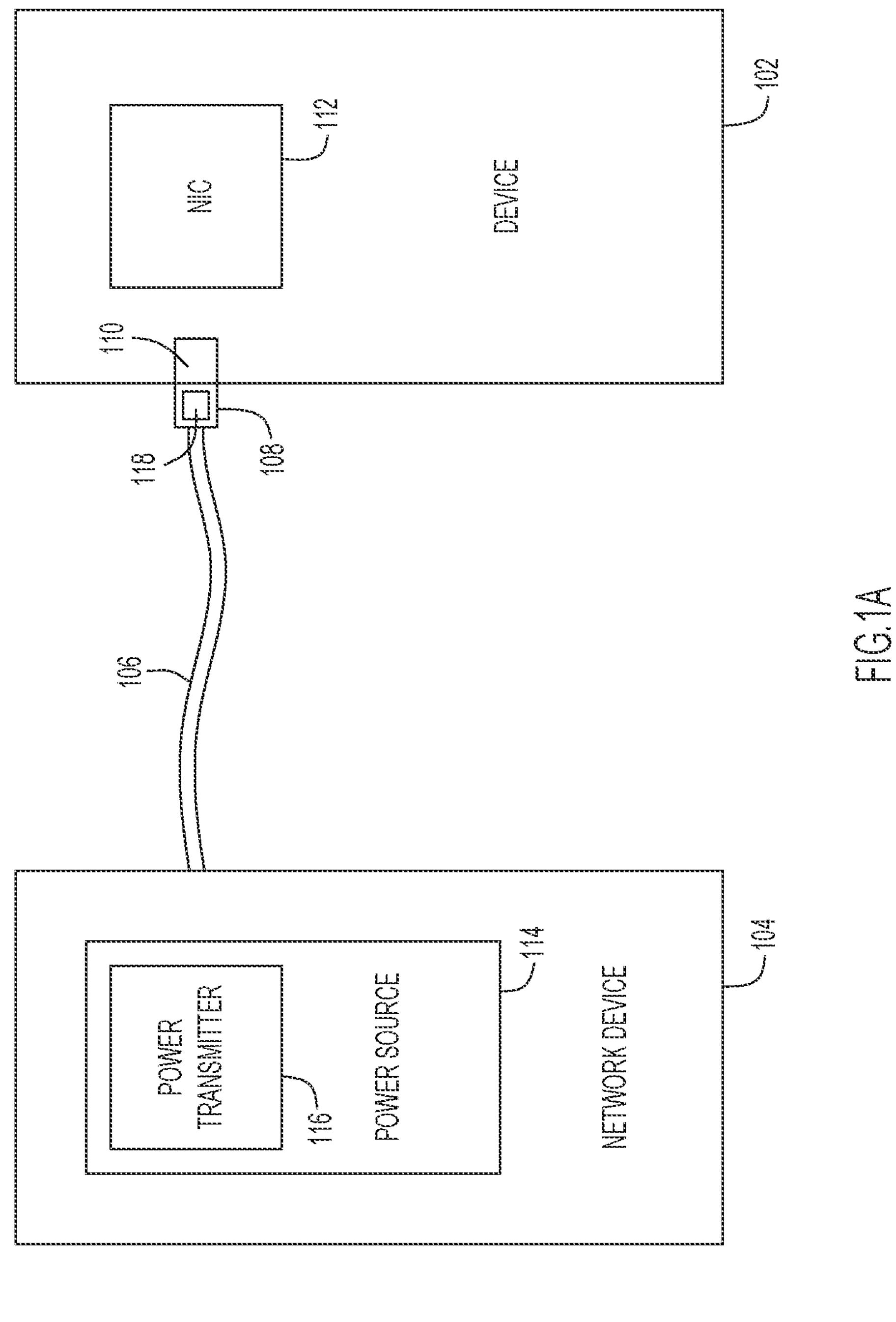
FIG. 1A is a block diagram of an example system that includes a network cable with a resistor, according to an example embodiment.

Presented herein are techniques for preventing an electrical arc upon disconnect of a connector of a network cable from a device. According to one aspect, a method is provided that involves monitoring a network cable connected to a device for faults at a remote location from a connector of the network cable by observing conditions on the network cable for power applied to the network cable, wherein the network cable is for sending data and power. The method further involves detecting a fault on the network cable, wherein the fault was introduced intentionally at the connector prior to disconnecting the connector from the device. The method further involves terminating power at the remote location that is sent over the network cable to prevent an electrical arc upon disconnecting the connector from the device.

According to another aspect, a system is provided that includes a device with a port; a network cable connected to the device via the port and the network cable has multiple channels or wires for sending data and power to the device; a connector at the end of the network cable; and a network device at a physically remote location with respect to the device. The network device can be used to monitor the network cable for faults and terminate power upon detection of a fault that was intentionally introduced at the connector.

EXAMPLE EMBODIMENTS

Techniques are presented herein for preventing an electrical arc upon disconnect of a connector of a network cable from a device. A network cable can be capable of carrying data and power over multiple wires or channels. The power can be an electrical current and can be carried at various wattages and voltages. A connector at the end of a network cable can be plugged into a port of the device and used to deliver power to the device. Sending power over the network cable to the device can be carried out using Power Over Ethernet (POE) techniques. PoE can provide current protection that may be limited to total power delivery up to 100 watts. The power can also be managed using Fault Managed Power (FMP) techniques, FMP can include techniques in which power is interrupted when a fault condition is detected on the network cable.

An electrical arc can be caused when power is sent over the network cable and the connector of the network cable is disconnected from the port of the device while the power is still being carried over the network cable. An electric arc can be described as an electrical breakdown of a gas that produces a prolonged electrical discharge. The current through a normally nonconductive medium such as air produces a plasma; the plasma may produce visible light. With higher wattage and voltage of power being carried over network cables using PoE or FMP, then an electrical arc upon network cable disconnect can be more likely to occur. An electrical arc can pose a safety hazard to a user that is disconnecting the network cable and can also cause damage to equipment such as the network cable or the device. Therefore, the following systems and methods provide techniques to prevent such an electrical arc upon network cable disconnect.

FIG. 1A shows an example system 100 that includes a device 102 connected to a network device 104 via a network cable 106. The network cable 106 can carry power and data from the network device 104 to the device 102. The network cable 106 can include a connector 108 to interface or plug into a port 110 of the device 102. The connector and port can have a standard form factor such as an Ethernet connector and port, a Register Jack 45 (RJ45), or similar connector form factor. The device 102 can be an electronic or computing device such as a server computer, a blade computer, a switch, a top-of-rack (TOR) switch, a router, a network node, a desktop computer, a laptop computer, etc. The device 102 can interface with the network device 104 via a network interface card (NIC) 112. The NIC 112 of the device 102 can also be referred to as a network adapter that can provide network connectors for the device 102. The NIC 112 can transmit and receive data signals, via the connector 108 and port 110, at a physical layer and deliver data packets at a network layer. The NIC 112 can act as a middleman between a computer/server and a data network. The network device 104 can be an electronic or computing device such as a server computer, a router, a switch, a patch panel, etc. The network device 104 can be located physically remote to the device 102, meaning that the network device 104 and the device 102 may not be physically adjacent or physically connected to one another.

The network cable 106 can carry power at a voltage or wattage that can cause an electrical arc upon disconnecting the connector 108 from the port 110. The network device

104 can send power to the device 102 via a power source 114. The power source 114 is depicted as part of the network device 104, but it should be appreciated that the power source 114 can also be separate from or remote to the network device 104. The power source 114 can employ a power transmitter 116 to send the power to the device 102. For example, the power transmitter 116 can determine the amount of current, as well as the voltage or wattage of electricity that is transmitted over the network cable 106. The power transmitter 116 may be capable of sending pulsed multi-phase power. In one example, the multi-phase power is four phase power. The power transmitter 116 can start or stop sending electrical power over the network cable 106 to the device 102. In one example, the power transmitter 116 can detect an electrical fault that has occurred and is associated with one of the power lines of the network cable 106, and the power transmitter 116 can terminate power or reduce power that is sent over the given power line in response to the fault detection. The power transmitter 116 is depicted as being part of the power source 114; however, the power transmitter 116 may not be part of the power source 114. In one example, the power transmitter 116 can be part of the network device 104, while the power source 114 is remote to the network device 104. The power transmitter 116 can be capable of managing power sent to the device 102 from a location remote to the device 102 using techniques referred to as Fault Managed Power (FMP). In one example, either PoE or FMP can be used to manage power from the power transmitter 116 that is up to 100 watts. PoE may be limited to power up to 100 watts for safety reasons. In one example, FMP can manage power from the power transmitter 116 that is 200 volts or higher and 300 watts or higher.

The use of FMP with the techniques presented herein can allow for the network cable 106 to have a length that is the same as or longer than the length limits imposed by PoE. In one example, with the use of either FMP or PoE the length of the network cable 106 can be 5 to 100 meters in length. In one example, with the use of FMP, the length of the network cable 106 can be above 100 meters in length. In another example, with the use of FMP, the length of the network cable 106 can be up to 2 kilometers in length. An increase in the length of the network cable 106 can allow for an increase in the distance between the device 102 and the network device 104, meaning that the distance for the physically remote location that is used for monitoring for faults and for terminating power can be increased as compared to what can be accomplished using PoE.

The connector 108 can include a resistor 118 inside of the connector. The resistor 118 can be capable of intentionally introducing a fault or short at the connector 108. In one example, the resistor 118 can be a 1k ohm resistor. In one example, the resistor 118 can have a minimum value of a fault model for line to line of 575 ohms and a maximum value of 15k ohms. The maximum value can be calculated by dividing 450 volts by 30 mA. It should be appreciated that the higher the resistance of the resistor 118, the longer the time will be to detect a fault. In one example, the resistor 118 can have a resistance in a range of 500 ohms to 5k ohms. The power transmitter 116 can monitor the network cable 106 with the connector 108 for a fault. In one example, the power transmitter 116 can be observing conditions, such as monitoring for faults, on the network cable 106 between pulses of power applied to the network cable 106. The power transmitter 116 can detect a fault that has been intentionally introduced using the resistor 118. For example, an operator can press or engage a button associated with the resistor 118 to connect or short the resistor 118. The power transmitter 116 then detects the fault after the button has been pressed. Upon detecting the fault that was intentionally introduced at the connector 108 using the resistor 118, the power transmitter 116 can terminate or reduce the power carried over the network cable 106. The operator can then safely disconnect connector 108 from the port 110 of the device 102 without the risk of an electrical arc upon disconnect. Thus, the operator can engage the button intentionally prior to disconnecting the connector 108 from the port 110 and safely disconnect the connector 108 after the power has been terminated by the power transmitter 116.

Embodiments of the present technology can be employed with multi-phase power. It should be appreciated that with multi-phase power, a different resistor may be employed for each phase of power. For example, for four phase power, four resistors, each located in the connector 108, may be employed for detecting a fault.

It should be appreciated that examples of the present technology can include multiple instances of network cables with connectors that are connected to a device. For example, the network device 104 can include four or more network cables where each network cable includes a connector with a resistor at the end of the network cable. A fault can be intentionally introduced at each such resistor. Each resistor can be monitored for a fault and power being carried by an individual network cable and connector can be terminated in response to a fault being detected at a given connector.

Figure 1B:
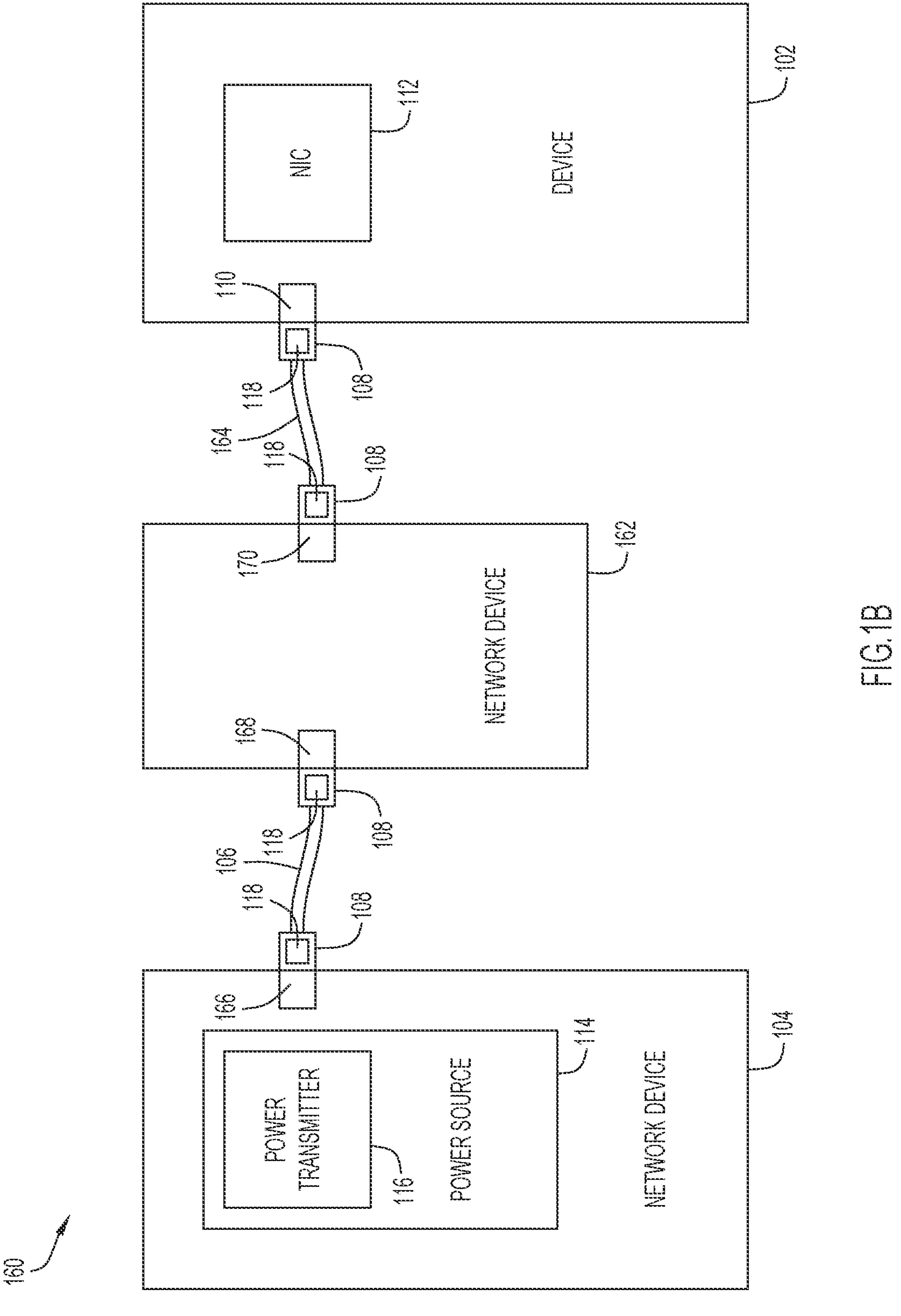
FIG. 1B is a block diagram of an example system that includes a plurality of network cables with resistors, according to an example embodiment.

FIG. 1B shows an example system 160 that includes a device 102 connected to a network device 162 via the network cable 106. The network device 162 is connected to the device 102 via a network cable 164. The network cable 164 can have the same features and capabilities as the network cable 106. Each end of the network cable 106 and the network cable 164 has a connector 108 with a resistor 118. The network cable 106 can be connected to a port 166 of the network device 104 and to a port 168 of the network device 162. The network cable 164 can be connected to a port 170 of the network device 162 and to the port 110 of the device 102. The network device 162 can be an electronic or computing device, such as a server computer, a router, a switch, a patch panel, etc. The example system 160 depicts the network device 104 being connected to the device 102 via the network cable 106 and the network cable 164. The network cable 106 and the network cable 164 can be described as being one multi-segmented network cable. It should be appreciated that the network device 104 can be connected to the device 102 via any number of network cables that can be described as being one multi-segmented network cable. Embodiments of the present technology are capable of detecting a fault at any connector of any one of a plurality of network cables that form a multi-segmented network cable. Thus, a fault can be intentionally introduced at any connector of a multi-segmented network cable, power can be terminated at that connector in response to the fault, and an electrical arc can be prevented at that connector.

Figure 2:
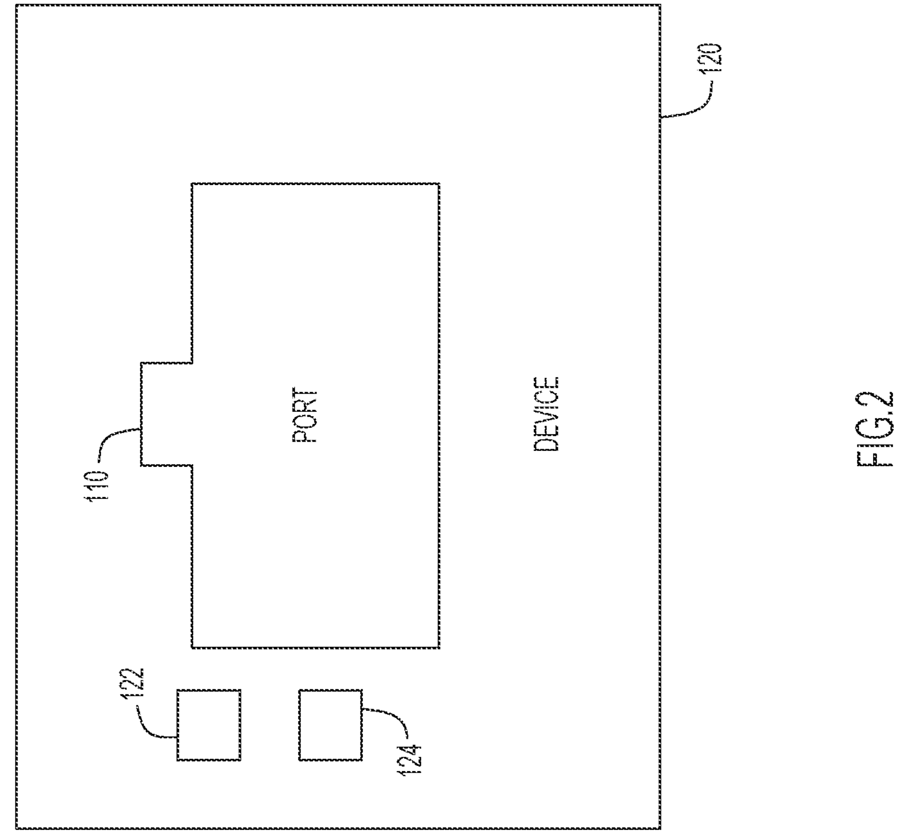
FIG. 2 is a block diagram of an example device with a button and a Light Emitting Diode (LED), according to an example embodiment.

FIG. 2 shows an example system 120 that includes the device 102 with the port 110. The device 102 can include a button 122. The button 122, when engaged, can introduce a fault in the connector of a network cable, such as connector 108, using a resistor in the connector. In response to the button 122 being engaged and the fault introduced, power carried to the port 110 can be terminated. The device 102 can also include a Light Emitting Diode (LED) 124. The LED 124 can indicate whether power is currently being carried or not by the network cable and connector that are connected to the port 110. The LED 124 can be capable of being energized to emit light or not energized, so no light is emitted. For example, light emitted from the LED 124 can indicate that power is being carried by a network cable and connector to the port 110 while no light being emitted by the LED 124 can indicate that no power is being carried to the port 110. The LED 124 may be capable of displaying different colors or patterns of flashing light. In one embodiment, different colors of light can be used to indicate different levels or amounts of power being carried over the network cable and connector to the port. For example, a red light emitted by the LED 124 can indicate a high level of power is being carried that is unsafe to disconnect the connector from the port 110, while a green light emitted by the LED 124 can indicate a low level of power is being carried that is safe to disconnect the connector from the port 110, and no light emitted by the LED 124 can indicate no power is being carried. The low level of power can be a reduced level of power that is initiated by the power transmitter 116 in response to a fault detected at a resistor in the connector of the network cable, such as a fault intentionally introduced by engaging the button 122.

Figure 3:
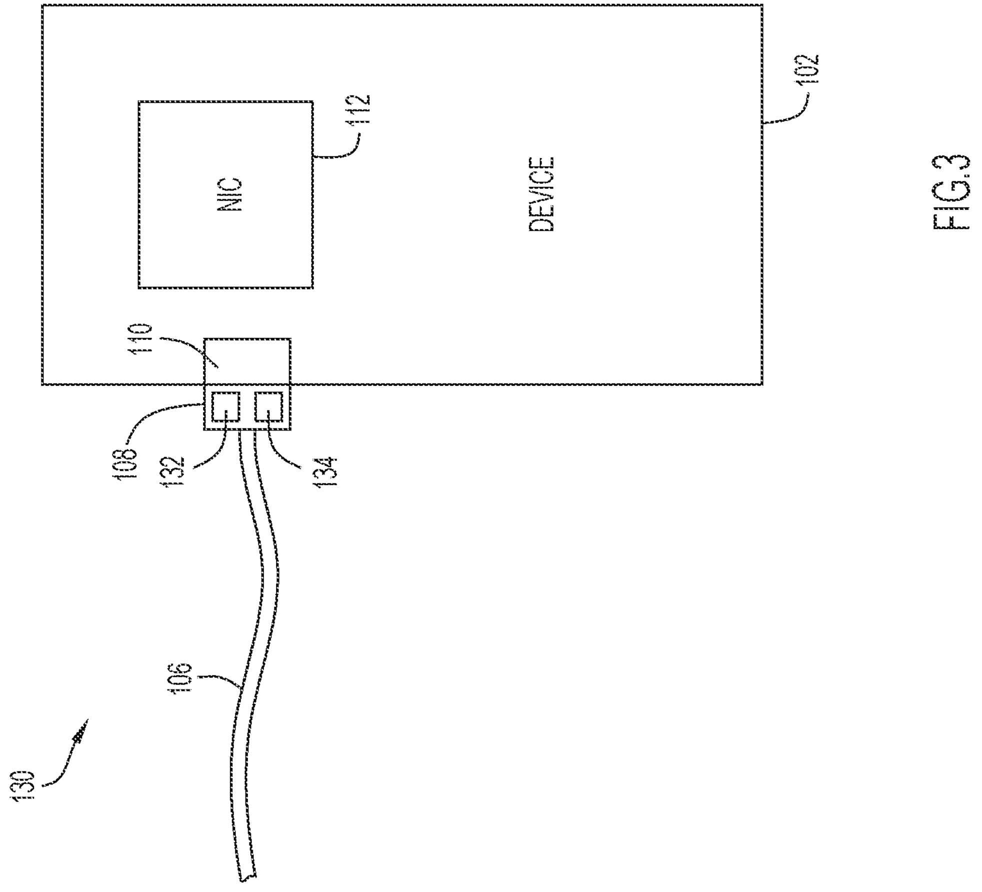
FIG. 3 is a side view of a network cable and a connector with a button and an LED, according to an example embodiment.

FIG. 3 shows a side view of an example system 130 that includes the connector 108 that is engaged or plugged into the port 110 of the device 102. The connector 108 is depicted as including a button 132 and an LED 134. The button 132 can be engaged to intentionally introduce a fault using a resistor associated with the connector 108. After the button 132 has been engaged and the fault introduced, power carried over the network cable 106 can be terminated or reduced. The LED 134 can indicate whether power is being carried over the connector 108 or not. The LED 134 can also indicate a level of power that is being carried over the connector 108. The button 132 and the LED 134 can have the same features and capabilities as the button 122 and the LED 124 of FIG. 2, respectively, with the difference being that the button 132 and the LED 134 are located on the connector 108, while the button 122 and the LED 124 are located on the device 102.

Figure 4:
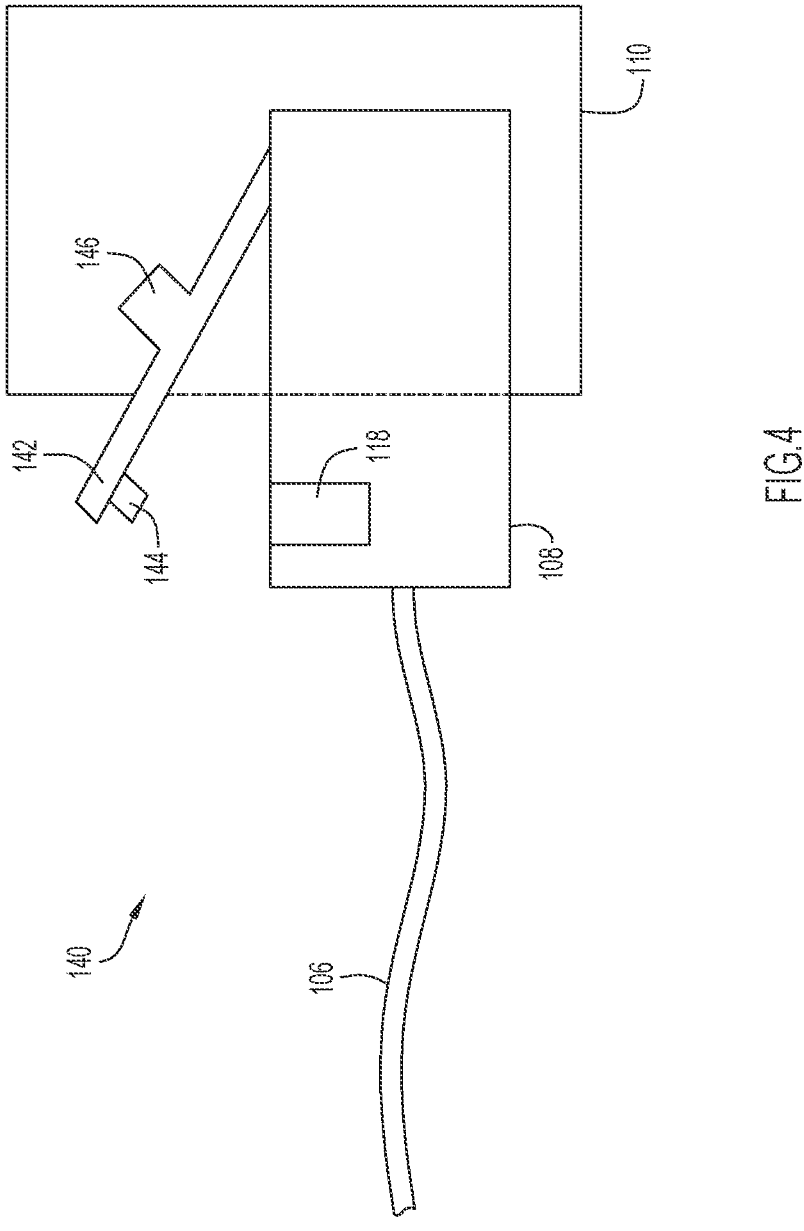
FIGS. 4 and 5 are side views of a network cable and a connector with a latch, according to an example embodiment.

FIG. 4 shows a side view of an example system 140 that includes the connector 108 that is engaged or plugged into the port 110 of a device, such as device 102 of FIG. 1A. The connector 108 can include the resistor 118 and a latch 142. The latch 142 can be connected to the connector 108 at a portion of the connector 108 that is furthest from the network cable 106. A length of the latch 142 can extend away from the connector 108 when the latch is in the open position, as is depicted in FIG. 4. In the open position, the distal end of the latch 142 is above the rear portion of the connector 108 that is closest to the network cable 106. The latch 142 can include a metal contact bar 144. A portion of the resistor 118 can be exposed along a top surface of the connector 108; the latch 142 can be depressed so that the metal contact bar 144 can contact the exposed portion of the resistor 118. When the metal contact bar 144 is in contact with the exposed portion of the resistor 118, a short can be created at the resistor 118 and a fault introduced. The fault can be introduced intentionally and then detected remotely, and the power that is carried over the network cable 106 and the connector 108 can be terminated or reduced. The latch 142 can be spring-loaded such that the metal contact bar 144 is not in continuous contact with the resistor 118 and is only in contact with the resistor 118 when the latch 142 is depressed with a predetermined amount of force.

The latch 142 can also include a protrusion 146. When the latch 142 is inserted into the port 110 and the latch 142 is in the open position, then the protrusion 146 can prevent the connector 108 from being removed from the port 110. For example, if an attempt is made to remove the latch 142 from the port 110 after the latch 142 has been inserted into the port 110 in the open position, then the protrusion 146 will contact a portion of the port 110 and the protrusion 146 will thus prevent the connector 108 from being removed from the port 110. Therefore, to remove the connector 108 from the port 110, in this example, the latch 142 can be depressed to the closed position to overcome the spring force and the metal contact bar 144 can contact the resistor 118. In so doing, the protrusion 146 will be moved such that the protrusion 146 may not contact a portion of the port 110 and the connector 108 can be removed from the port 110 with the latch 142 in the closed position. The latch 142 with the protrusion 146 can be described as serving to secure the connector 108 to the port 110. Therefore, in this example, the metal contact bar 144 will contact the resistor 118 before the connector 108 can be removed, and thus a fault can be introduced at the resistor 118. The fault can be detected and the power to the connector 108 terminated to prevent an arc upon disconnect of the connector 108.

In one example, the timing of the fault detection for a fault that is intentionally introduced is based on the current carried by the network cable. For example, assuming a source voltage of 400V carried over the network cable for power and 575 ohms for the resistor 118, the fault may take 23.3 ms to detect. In an example with 1000 ohms for the resistor 118, the fault may take 51.3 ms to detect. In an example with 2000 ohms for the resistor 118, the fault may take 138 ms to detect.

Figure 5:
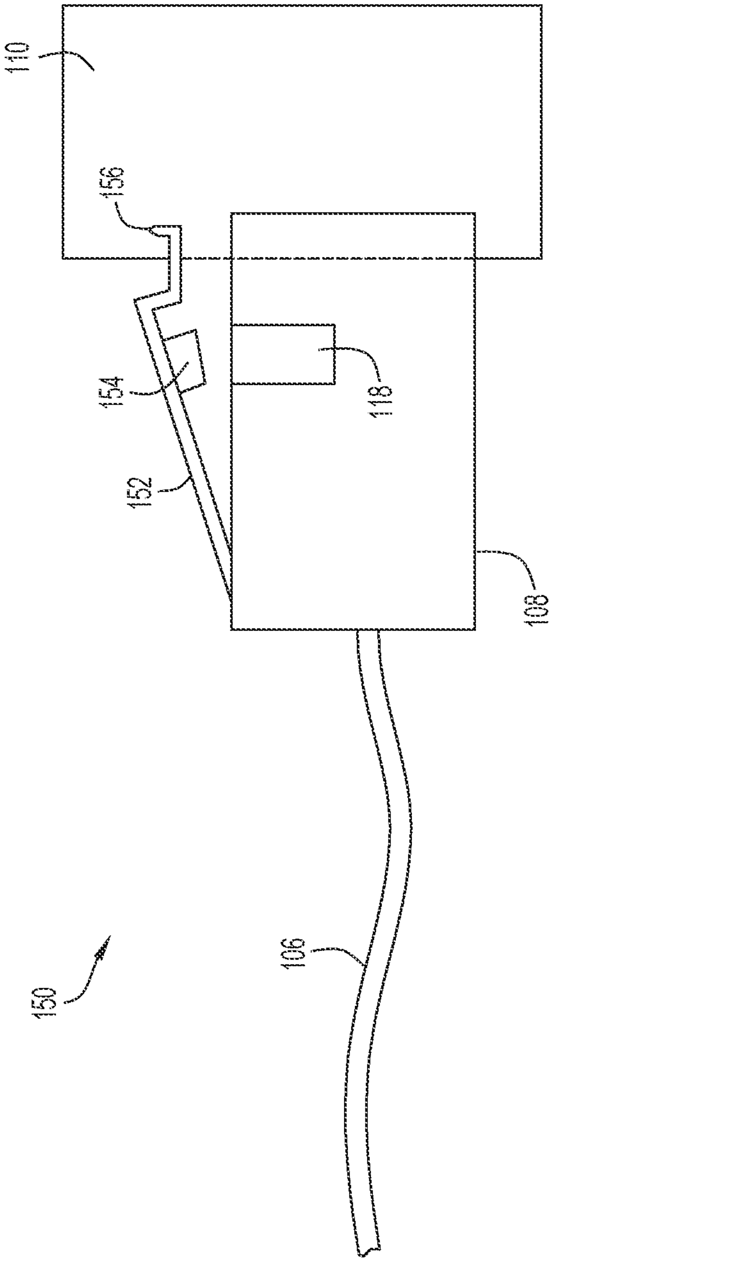

FIG. 5 shows a side view of an example system 150 that includes the connector 108 that is engaged or plugged into the port 110 of a device such as device 102 of FIG. 1A. The connector 108 can include the resistor 118 and a latch 152. The latch 152 can be connected to the connector 108 at a portion of the connector 108 that is closest to the network cable 106, which is different from the latch 142 of FIG. 4. A length of the latch 152 can extend away from the connector 108 when the latch is in the open position as is depicted. In the open position, the distal end of the latch 152 is above a front portion of the connector 108 that is furthest from the network cable 106. The protrusion 156 can be described as a lip or a hook that is different in shape than the protrusion 146 of FIG. 4 that is more of a bump or a bulge. The latch 152 can include a metal contact bar 154. A portion of the resistor 118 can be exposed along a top surface of the connector 108. The latch 152 can be depressed so that the metal contact bar 154 can contact the exposed portion of the resistor 118. When the metal contact bar 154 is in contact with the exposed portion of the resistor 118, a short can be created at the resistor 118 and a fault introduced. The fault can be introduced intentionally and then detected remotely, and the power that is carried over the network cable 106 and the connector 108 can be terminated or reduced. The latch 152 can be spring-loaded such that the metal contact bar 154 is not in continuous contact with the resistor 118 and is only in contact with the resistor 118 when the latch 152 is depressed with a predetermined amount of force.

The latch 152 can also include a protrusion 156. When the latch 152 is inserted into the port 110 and the latch 152 is in the open position, the protrusion 156 is configured to prevent the connector 108 from being removed from the port 110. For example, if an attempt is made to remove the latch 152 from the port 110 after the latch 152 has been inserted into the port 110 in the open position, then the protrusion 156 will contact a portion of the port 110 and the protrusion 156 thus prevents the connector 108 from being removed from the port 110. Therefore, to remove the connector 108 from the port 110, in this example, the latch 152 can be depressed to the closed position to overcome the spring force and the metal contact bar 154 can contact the resistor 118. In so doing, the protrusion 156 will be moved such that the protrusion 156 may not contact a portion of the port 110, and the connector 108 can be removed from the port 110 with the latch 152 in the closed position. The latch 152 with the protrusion 156 can be described as serving to secure the connector 108 to the port 110. Therefore, in this example, the metal contact bar 154 will contact the resistor 118 before the connector 108 can be removed and thus a fault can be introduced at the resistor 118. The fault can be detected and the power to the connector 108 terminated to prevent an arc upon disconnect of the connector 108. It should be appreciated that a device associated with the port 110 can be a device such as a switch that has a plurality of ports that are each connected to a network cable, where each network cable ends with a connector that has a latch similar to the latch 142 or the latch 152. Thus, each of the plurality of network cables with connectors can be monitored for intentional faults that are introduced by depressing the latch. Upon depressing an individual latch, power can be terminated to the given network cable and an electrical arc upon disconnect of the network cable can be prevented.

Figure 6:
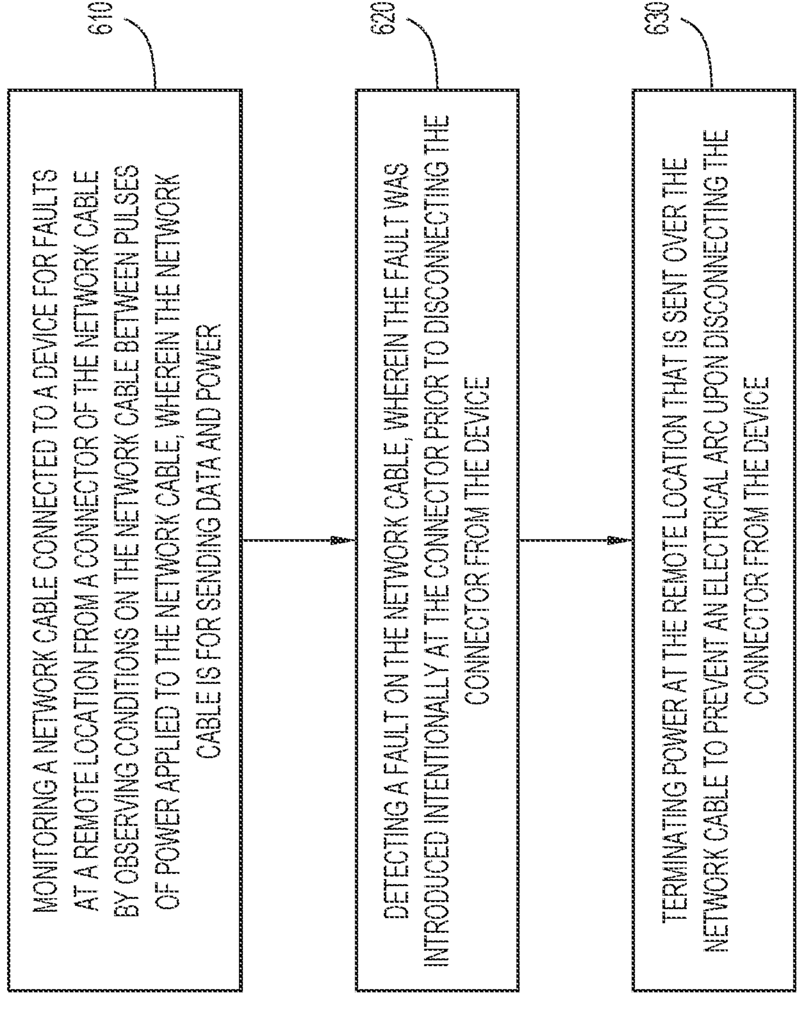
FIG. 6 is a flow chart depicting a method for preventing an arc upon disconnecting a device from a network cable, according to an example embodiment.

FIG. 6 illustrates a flow chart for a method 600 to prevent an arc upon disconnecting a device from a network cable. This method 600 is applicable to operation of any of the network cables with connectors presented herein. The method 600 includes, at step 610, monitoring a network cable connected to a device for faults at a remote location from a connector of the network cable by observing conditions of power applied to the network cable, wherein the network cable is for sending data and power. The method 600 further includes, at step 620, detecting a fault on the network cable, wherein the fault was introduced intentionally at the connector prior to disconnecting the connector from the device. At step 630, the method 600 further includes terminating power at the remote location that is sent over the network cable to prevent an electrical arc upon disconnecting the connector from the device.

Preventing Arc on Network Cable Disconnect Aspects

In some aspects, the techniques described herein relate to a method including: monitoring a network cable connected to a device for faults at a remote location from a connector of the network cable by observing conditions of power applied to the network cable, wherein the network cable is for sending data and power; detecting a fault on the network cable, wherein the fault was introduced intentionally at the connector prior to disconnecting the connector from the device; and terminating power at the remote location that is sent over the network cable to prevent an electrical arc upon disconnecting the connector from the device.

In some aspects, the techniques described herein relate to a method, wherein the network cable is one of a plurality of network cables that form a multi-segmented network cable and the device is one of a plurality of devices that are connected via the multi-segmented network cable.

In some aspects, the techniques described herein relate to a method, wherein the fault was introduced intentionally when a resistor located in the connector is connected.

In some aspects, the techniques described herein relate to a method, wherein the fault was introduced intentionally via a button at the connector.

In some aspects, the techniques described herein relate to a method, wherein the fault was introduced intentionally via a latch at the connector that secures the connector to the device.

In some aspects, the techniques described herein relate to a method, further including sending an indication from the remote location to a light emitting diode (LED) associated with the connector that power is active at the connector.

In some aspects, the techniques described herein relate to a method, further including sending an indication from the remote location to an LED associated with the connector that power has been terminated at the connector.

In some aspects, the techniques described herein relate to a system including: a device with a port; a network cable connected to the device via the port, the network cable is configured for sending data and power to the device; a connector at an end of the network cable; and a network device at a physically remote location with respect to the device, wherein the network device is configured to: monitor the network cable connected to the device for faults by observing conditions of power applied to the network cable; detect a fault on the network cable, wherein the fault was introduced intentionally at the connector prior to disconnecting the connector from the device; and terminate power that is sent over the network cable to prevent an electrical arc upon disconnecting the connector from the device.

In some aspects, the techniques described herein relate to a system, wherein the network cable is one of a plurality of network cables that form a multi-segmented network cable and the device is one of a plurality of devices that are connected via the multi-segmented network cable.

In some aspects, the techniques described herein relate to a system, further including a resistor located in the connector wherein the fault was introduced intentionally when the resistor is connected.

In some aspects, the techniques described herein relate to a system, wherein the resistor is a 1 k ohm resistor.

In some aspects, the techniques described herein relate to a system, further including a button wherein the fault was introduced intentionally when the button is engaged.

In some aspects, the techniques described herein relate to a system, wherein the button is located on the connector.

In some aspects, the techniques described herein relate to a system, wherein the button is located on the device.

In some aspects, the techniques described herein relate to a system, further including a latch that secures the connector to the device wherein the fault was introduced intentionally when the latch is disconnected.

In some aspects, the techniques described herein relate to a system, further including a light emitting diode (LED) associated with the connector that indicates the power from the network device is active at the connector.

In some aspects, the techniques described herein relate to a system, wherein the LED indicates that power from the network device has been terminated at the connector.

In some aspects, the techniques described herein relate to a system, wherein a distance between the physically remote location and the device is more than 100 meters and the network cable is more than 100 meters in length.

In some aspects, the techniques described herein relate to a system, wherein a distance between the physically remote location and the device is up to 2 kilometers and the network cable is up to 2 kilometers in length.

In some aspects, the techniques described herein relate to an apparatus including: a network cable for sending data and power to a device from a network device located at a remote location; a connector at an end of the network cable configured to connect to a port associated with the device; and a resistor in the connector configured to cause a fault to be detected by the network device for power applied to the network cable when the resistor is connected, such that the power is then terminated in response to the fault.

In some aspects, the techniques described herein relate to an apparatus, wherein the network cable is one of a plurality of network cables that form a multi-segmented network cable and the device is one of a plurality of devices that are connected via the multi-segmented network cable.

In some aspects, the techniques described herein relate to an apparatus, wherein the resistor is a 1 k ohm resistor.

In some aspects, the techniques described herein relate to an apparatus, wherein the resistor is connected at the connector via a button that is engaged.

In some aspects, the techniques described herein relate to an apparatus, wherein the resistor is connected at the connector via a latch that secures the connector to the device.

In some aspects, the techniques described herein relate to an apparatus, further including a light emitting diode (LED) associated with the connector that indicates the power from the network device is active at the connector.

In some aspects, the techniques described herein relate to an apparatus, wherein the LED indicates that power from the network device has been terminated at the connector.

Figure 7:
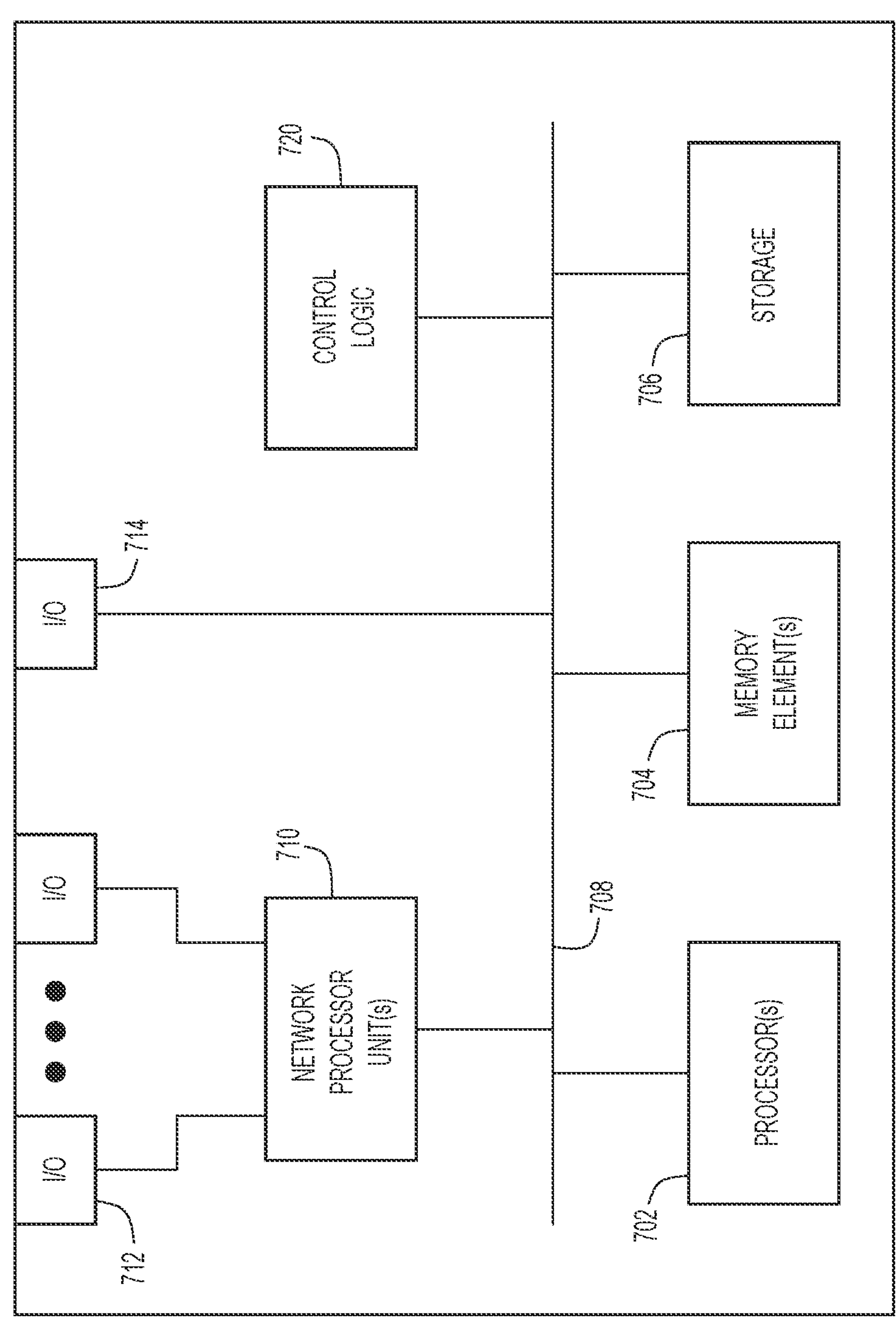
FIG. 7 is a block diagram of a computing or networking apparatus, according to an example embodiment.

FIG. 7 illustrates a hardware block diagram of a device 700 that may perform functions associated with operations discussed herein in connection with the techniques depicted in FIGS. 1A-B and 2-5. For example, the device 700 can be the device 102 of FIGS. 1A-B and 2-3 or the network device 104 of FIG. 1A or the network device 162 of FIG. 1B.

In at least one embodiment, the device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for device 700 can overlap in any manner and are not limited to the specific allocation of instructions and/or operations described herein. In one example, the network processing unit(s) 710 can be the NIC 112 of FIGS. 1A-B and 3. In one example, the one or more network I/O interface(s) 712 can be the ports of the present technology such as port 110 of FIGS. 1A-B and 2-5.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of a computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained by one skilled in the art and it is intended that the present disclosure encompass all such changes, substitutions, variations, alterations, and/or modifications as falling within the scope of the appended claims.

What is claimed is:

1. A method comprising:

monitoring a network cable connected to a device for faults at a remote location from a connector of the network cable by observing conditions of power carried by the network cable, wherein the network cable is for sending data and power;

detecting a fault on the network cable, wherein the fault was introduced intentionally at the connector prior to disconnecting the connector from the device;

terminating power at the remote location that is sent over the network cable to prevent an electrical arc upon disconnecting the connector from the device; and controlling, from the remote location, a light emitting diode (LED) at the connector to indicate whether power is active at the connector or whether power has been terminated at the connector as a result of the fault intentionally introduced at the connector.

2. The method of claim 1, wherein the network cable is one of a plurality of network cables that form a multi-segmented network cable and the device is one of a plurality of devices that are connected via the multi-segmented network cable.

3. The method of claim 1, wherein the fault was introduced intentionally when a resistor located in the connector is connected.

4. The method of claim 1, wherein the fault was introduced intentionally via a button at the connector.

5. The method of claim 1, wherein the fault was introduced intentionally via a latch at the connector that secures the connector to the device.

6. The method of claim 1, wherein controlling comprises controlling the LED to energize and emit light when power is active at the connector and to not emit light when power is terminated at the connector.

7. The method of claim 1, wherein controlling comprises controlling the LED to display different colors or patterns of light to indicate different levels or amounts of power being carried over the network cable to the connector.

8. A system comprising:

a device with a port;

a network cable connected to the device via the port, the network cable is configured for sending data and power to the device;

a connector at an end of the network cable;

a light emitting diode (LED) positioned at the connector; and a network device at a physically remote location with respect to the device, wherein the network device is configured to:

monitor the network cable connected to the device for faults by observing conditions of power carried by the network cable;

detect a fault on the network cable, wherein the fault was introduced intentionally at the connector prior to disconnecting the connector from the device;

terminate power that is sent over the network cable to prevent an electrical arc upon disconnecting the connector from the device; and control the LED at the connector to indicate whether power is active at the connector or whether power has been terminated at the connector as a result of the fault intentionally introduced at the connector.

9. The system of claim 8, wherein the network cable is one of a plurality of network cables that form a multi-segmented network cable and the device is one of a plurality of devices that are connected via the multi-segmented network cable.

10. The system of claim 8, further comprising a resistor located in the connector wherein the fault was introduced intentionally when the resistor is connected.

11. The system of claim 10, wherein the resistor is a 1k ohm resistor.

12. The system of claim 9, further comprising a button wherein the fault was introduced intentionally when the button is engaged.

13. The system of claim 12, wherein the button is located on the connector.

14. The system of claim 12, wherein the button is located on the device.

15. The system of claim 9, further comprising a latch that secures the connector to the device wherein the fault was introduced intentionally when the latch is disconnected.

16. The system of claim 9, wherein the network device is configured to control the LED to energize and emit light when power is active at the connector and not emit light when power is terminated at the connector.

17. The system of claim 9, wherein the network device is configured to control the LED to display different colors or patterns of light to indicate different levels or amounts of power being carried over the network cable to the connector.

18. The system of claim 9, wherein a distance between the physically remote location and the device is more than 100 meters and the network cable is more than 100 meters in length.

19. The system of claim 9, wherein a distance between the physically remote location and the device is up to 2 kilometers and the network cable is up to 2 kilometers in length.

20. An apparatus comprising:

a network cable for sending data and power to a device from a network device located at a remote location;

a connector at an end of the network cable configured to connect to a port associated with the device;

a latch that secures the connector to the device; and a resistor in the connector, the resistor configured to cause a fault when the latch is in a particular position, the fault to be detected by the network device for power applied to the network cable, such that the power is then terminated in response to the fault.

21. The apparatus of claim 20, wherein the network cable is one of a plurality of network cables that form a multi-segmented network cable and the device is one of a plurality of devices that are connected via the multi-segmented network cable.

22. The apparatus of claim 20, wherein the resistor is a 1k ohm resistor.

23. The apparatus of claim 20, wherein the resistor is connected at the connector via a button that is engaged.

24. The apparatus of claim 20, wherein the latch includes a metal contact bar, the latch being spring-loaded so that when the latch is inserted into a port of the device the latch is forced to a first position that prevents removal of the connector from the port and the metal contact bar is not in contact with the resistor, and the latch is permitted to be moved to a second position based on a depress force on a surface of the latch that overcomes the spring-loaded force and allows removal of the connector from the port and also causes the metal contact bar on the latch to make electrical contact with the resistor to cause the fault.

25. The apparatus of claim 20, further comprising a light emitting diode (LED) associated with the connector that indicates the power from the network device is active at the connector.

26. The apparatus of claim 25, wherein the LED indicates that power from the network device has been terminated at the connector.

* * * * *